United States Patent
Jien et al.

(10) Patent No.: US 9,281,968 B2
(45) Date of Patent: Mar. 8, 2016

(54) DIFFERENTIAL CIRCUIT SYSTEM (71) Applicants: GLOBAL UNICHIP CORPORATION, Hsinchu (TW); TAIWAN SEMICONDUCTOR MANUFACTURING CO., LTD, Hsin-Chu (TW)

(72) Inventors: Fan-Yi Jien, Taichung (TW); Wen-Tai Wang, Hsinchu County (TW); Sheng-Tsai Huang, Hsinchu County (TW); Yen-Cheng Chen, Taipei (TW)

(73) Assignees: GLOBAL UNICHIP CORPORATION, Hsinchu (TW); TAIWAN SEMICONDUCTOR MANUFACTURING CO., LTD, Hsin-Chu (TW)

(*) Notice: Subject to any disclaimer, the term of this patent is extended or adjusted under 35 U.S.C. 154(b) by 18 days.

(21) Appl. No.: 14/505,934

(22) Filed: Oct. 3, 2014

(65) Prior Publication Data

US 2015/0097616 A1    Apr. 9, 2015

(30) Foreign Application Priority Data

Oct. 4, 2013  (TW) .............................. 102136073 A (51) Int. Cl.
*H03L 5/00* (2006.01)
*H04L 25/02* (2006.01)

(52) U.S. Cl.
CPC ................... *H04L 25/0272* (2013.01)

(58) Field of Classification Search
CPC ..................................................... H03K 5/1252
USPC ....................... 327/333, 306, 108; 326/82–87
See application file for complete search history.

(56) References Cited

U.S. PATENT DOCUMENTS

| 8,816,727 | B2* | 8/2014 | Hoogendoorn | ........... G06F 3/14 327/108 |
| 9,041,241 | B2* | 5/2015 | Zhu | ......................... H04L 25/02 307/1 |
| 2008/0116943 | A1* | 5/2008 | Nair | ............... H03K 19/018528 327/108 |

* cited by examiner

Primary Examiner — Dinh Le
(74) Attorney, Agent, or Firm — WPAT, P.C.; Justin King (57) ABSTRACT

A differential circuit system is provided. The differential circuit system includes: a different circuit set including a plurality of differential circuits, a voltage regulator, and a current drainage circuit set. The differential circuits are electrically connected between a first node and a second node, and each differential circuit generates a current flowing from the first node to the second node. A high voltage is provided to the first node and a low voltage is provided to the second node. The first node receives an external voltage. According to the first voltage, the voltage regulator generates the low voltage. The low voltage is provided to the second node. The current drainage circuit set generates a drainage current in between the second node and a ground voltage. A superposed current flowing to the voltage regulator is difference of the summation of currents minus the conducting current.

16 Claims, 5 Drawing Sheets

DIFFERENTIAL CIRCUIT SYSTEM

This application claims the benefit of Taiwan application Serial No. 102136073, filed Oct. 4, 2013, the subject matter of which is incorporated herein by reference.

FIELD OF THE INVENTION

The present invention relates to a differential circuit system, and more particularly to a differential circuit system with a current drainage circuit.

BACKGROUND OF THE INVENTION

Differential signaling is a method of transmitting two complementary signals on a transmission wire. After received, information are recognized and identified by comparing voltage difference between the two complementary signals. Differential signaling improves resistor to electromagnetic noise and is widely applied to high speed circuit design.

Figure 1:
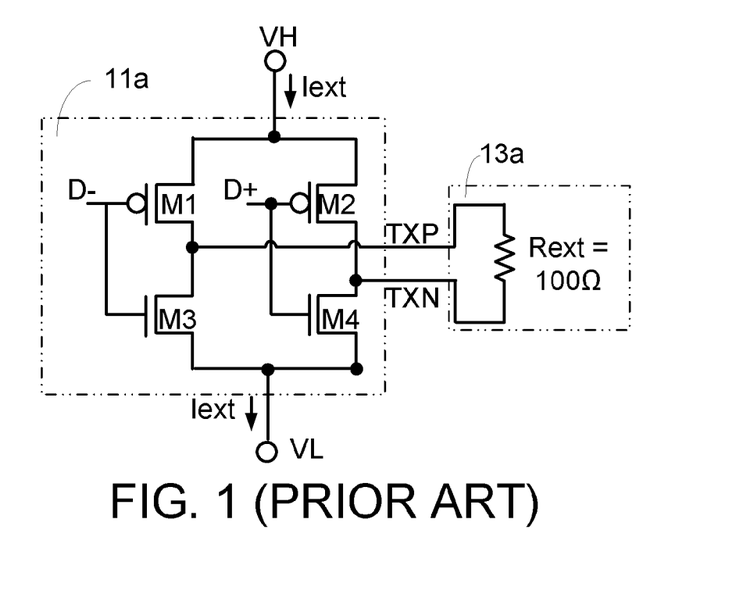
FIG. 1 (prior art) is a schematic view showing a differential circuit.

FIG. 1 is a schematic diagram illustrating a differential circuit. The differential circuit 11a includes a first transistor M1, a second transistor M2, a third transistor M3, and a fourth transistor M4. The first and the second transistors M1, M2 are PMOS transistors, and the third and the fourth transistors M3, M4 are NMOS transistors.

Source, gate, and drain of the first transistor M1 are respectively electrically connected to a high voltage VH, a negative input signal D−, and a first transmission wire TXP. Source, gate and drain of the third transistor M3 are respectively electrically connected to a low voltage VL, the negative input signal D−, and the first transmission wire TXP.

Source, gate, and drain of the second transistor M2 are respectively electrically connected to the high voltage VH, a positive input signal D+, and a second transmission wire TXN. Source, gate, and drain of the fourth transistor M4 are respectively electrically connected to the low voltage VL, the positive input signal D+, and the second transmission wire TXN. The first transmission wire TXP and the second transmission wire TXN form a differential pair.

As shown in FIG. 1, differential transmission wires of the differential circuit 11a are connected to an external circuit 13a. The external circuit 13a includes an external resistor Rext connected in between the first transmission wire TXP and the second transmission wire TXN. According to specification of Low Voltage Differential Signaling (hereinafter, LVDS), the external resistor is 100Ω, a voltage of +300 mV or −300 mV is generated at two terminals of the external resistor to represent two logic levels. Therefore, an external current flows the external resistor is +3 mA(+300 mV/100Ω) or −3 mA(−300 mV/100Ω).

Referring to FIG. 1, the first transistor M1 is turned on, the second transistor is M2 is turned off, the third transistor is turned off, and the fourth transistor M4 is turned on when voltage of the negative input signal D− is low level and voltage of the positive input signal D+ is high level. Meanwhile, the external current Iext flows from the high voltage VH to the low voltage VL via the first transistor M1, the first transmission wire TXP, the external resistor Rext, the second transmission wire TXN and the fourth transistor M4. Therefore, voltage across the external resistor Rext is +300 mV when the external current Iext is 3 mA.

On the other hand, when the negative input signal D− is high level and the positive input signal D+ is low level, the first transistor M1 is turned off, the second transistor M2 is turned on, the third transistor M3 is turned on and the fourth transistor is turned off. In such case, the external current Iext flows from the high voltage VH to the low voltage VL via the second transistor M2, the second transmission wire TXN, the external resistor Rext, the first transmission wire TXP and the third transistor M3. Therefore, when the external current Iext is 3 mA, voltage across the external resistor Rext is −300 mV.

According to the above, the external current Iext always flows from the high regardless changes of the negative input signal D− and the positive input signal D+.

In general, a differential circuit system includes plural differential circuits. The plural differential circuits are connected in parallel between the high voltage VH and the low voltage VL. When all differential circuits in the differential circuit system simultaneously operate, the external current corresponding to each differential circuit are superposed. Thus, a large superposed current will be generated accordingly. Take LVDS specification as an example, when 20 differential circuits in the differential current system operate simultaneously, a superposed current with 60 mA (20×3 mA) is generated. Consequently, maintenance of the high voltage VH and the low voltage VL is important.

SUMMARY OF THE INVENTION

An embodiment of the present invention provides a differential circuit system in an integrated circuit. The differential circuit system is connected to an external power source for receiving an external voltage and a ground voltage. The differential circuit system includes a differential circuit set, a voltage regulator and a current drainage circuit set. The differential circuit set includes a plurality of differential circuits connected between a first node and a second node. Each of the plurality of the differential circuits generates a current flowing from the first node to the second node. The first node supplies a high voltage and the second node supplies a low voltage. The first node receives the external voltage. The voltage regulator generates the low voltage according to a first voltage and supplying the low voltage to the second node. The current drainage circuit set, connected between the second node and the ground voltage, generates a drainage current. A superposed current flowing to the voltage regulator is equivalent to summation of a plurality currents outputted by the plurality of differential circuits minuses the drainage current.

Another embodiment of the present invention provides a differential circuit system in an integrated circuit. The differential circuit system is connected to an external power source for receiving an external voltage and a ground voltage. The differential circuit system includes a differential circuit set, a voltage regulator and a current drainage circuit set. The differential circuit set includes a plurality of differential circuits connected between a first node and a second node. Each of the plurality of the differential circuits generates a current flowing from the first node to the second node. The first node supplies a high voltage and the second node supplies a low voltage. The second node receives the ground voltage. The voltage regulator generates the high voltage according to a second voltage and supplying the high voltage to the first node. The current drainage circuit set, connected between the first node and the external voltage, generates a drainage current. A superposed current supplied by the voltage regulator is equivalent to summation of a plurality currents outputted by the plurality of differential circuits minuses the drainage current.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
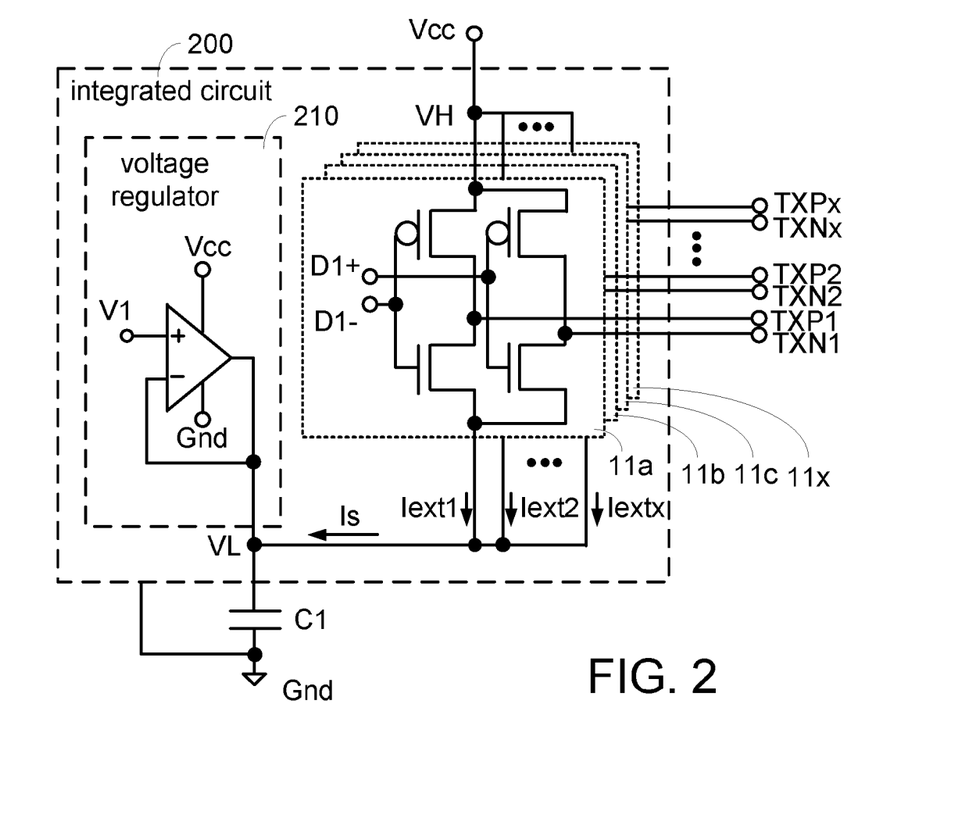
FIG. 2 is a schematic view showing a differential circuit system.

FIG. 2 is a schematic view showing a differential circuit system. The differential circuit system is part of an integrated circuit 200. The differential circuit system includes a voltage regulator 210 and a differential circuit set. The differential circuit set includes "x" differential circuits. Differential pairs (TXP1, TXN1), (TXP2, TXN2), (TXPx, TXNx) corresponding to each of the differential circuits are respectively connected to the external resistor (not shown) of the external circuit. Furthermore, structures of each of the differential circuits 11a, 11b, 11c and 11x are similar to the ones in FIG. 1 thus are not further illustrated.

Each of the different circuits 11a, 11b, 11c, 11x in the different circuit set is connected in between the high voltage VH and the low voltage VL in parallel. The integrated circuit 200 is connected to an external voltage Vcc, which is used as the high voltage VH. Moreover, the voltage regulator 210 in the integrated circuit 200 generates the low voltage VL according to a first voltage V1. Consequentially, the high voltage VH is equivalent to the external voltage Vcc, and the low voltage VL is equivalent to the first voltage V1. The high voltage VH is greater than the low voltage VL, and the low voltage VL is greater than the ground voltage Gnd.

Referring to the LVDS specification, when all the x differential circuits operate simultaneously, "x" external currents Iext1 to Iextx will be correspondingly generated. Assuming "x" is equivalent to 20 and each external current is 3 mA, a superposed current Is is 60 mA.

Referring to FIG. 2, the external voltage Vcc and the ground voltage Gnd are provided by a power source outside the integrated circuit 200. Thus, the external voltage Vcc and the ground voltage Gnd are relatively stable. Furthermore, the low voltage VL is generated by the voltage regulator inside the integrated circuit 200 and the low voltage VL is relatively unstable. Therefore, stability of the low voltage VL is an important issue of the different circuit system shown in FIG. 2.

The voltage regulator 210 receives the superposed current Is and provides the low voltage VL. The greater the superposed current is, the stronger driving ability of the voltage regulator 210 is required to maintain the low voltage VL at its output terminal. Furthermore, to maintain the stability of the low voltage VL, a capacitor C1 is externally connected to the integrated circuit 200. The capacitor C1 maintains stability of the low voltage VL by being connected between the output terminal of the voltage regulator 210 and the ground voltage Gnd.

For instance, if the superposed current Is in the differential circuit system shown in FIG. 2 is 60 mA, width of a metal conducting wire needs to be specially designed during the layout of the integrated circuit 200 in order to prevent the integrated circuit 200 from being damaged by large current. In general, the metal conducting wire with a width of at least 50 µm is used for the superposed current.

Furthermore, the voltage regulator 210 has an extra current consumption, i.e. a ground current, caused by maintaining the low voltage VL at the output terminal. Generally speaking, such extra current consumption is approximately 10% of the superposed current. Since the superposed current Is is large, capacitance of the externally connected capacitor C1 must be large.

Figure 3:
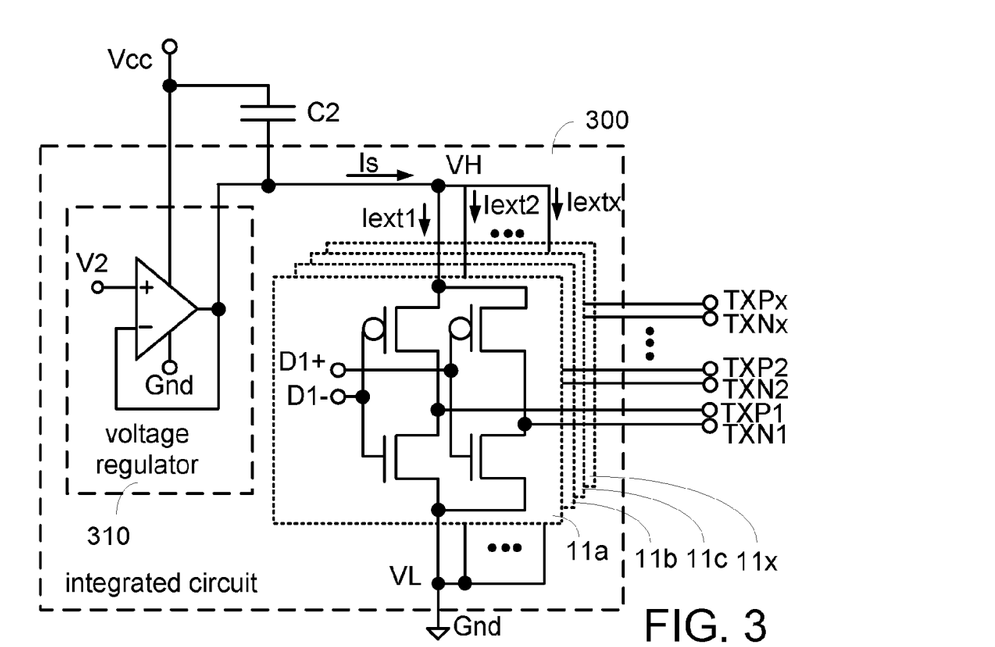
FIG. 3 is a schematic view showing another differential circuit system.

FIG. 3 is a schematic view showing another differential circuit system. The differential circuit system is inside the integrated circuit 300. The differential circuit system includes a voltage regulator 310 and a differential circuit set. The differential circuit set includes x differential circuits and each of which has a differential pair (TXP1, TXN1), (TXP2, TXN2), (TXPx, TXNx) respectively connected to the external resistor (not shown) in the external circuit.

As shown in FIG. 3, each differential circuit 11a, 11b, 11c, 11x in the differential circuit set is connected between the high voltage VH and the low voltage VL in parallel. In the integrated circuit 300, the voltage regulator 310 generates the high voltage VH according to a second voltage V2. Thus, the high voltage VH is equivalent to the second voltage V2. Furthermore, the ground voltage is used for the low voltage. Consequently, the external voltage Vcc is greater than the high voltage VH, and the high voltage VH is greater than the low voltage VL.

Similarly, an external power source outside the integrated circuit 300 supplies the external voltage Vcc and the ground voltage Gnd. Therefore, the external voltage Vcc and the ground voltage Gnd are relatively stable. Furthermore, the high voltage VH is generated by the voltage regulator 310 inside the integrated circuit 300 and the high voltage VH is relatively unstable. Thus, in the differential circuit system shown in FIG. 3, stabilizing the high voltage VH is an important issue.

Similarly, the voltage regulator 310 in FIG. 3 requires large driving ability to stably outputting the high voltage VH. In such case, a large capacitance C2, externally connected to the integrated circuit 300, is required to be connected between the output terminal of the regulator 310 and the external voltage Vcc in order to maintain the high voltage VH. Furthermore, width of the metal conducting wire flowing the superposed current has to be specially designed to prevent the metal conducting wire from being burned down when large current flows.

Similarly, in order to maintain the high voltage VH at the output terminal of the voltage regulator 310, an extra ground current consumption is generated at the voltage regulator 310. Usually, the extra ground current consumption is approximately 10% of the superposed current Is.

In order to reduce the ground current consumption in the voltage regulator and minimize the width of the metal conducting wire flowing the superposed current in the integrated circuit, a current drainage circuit is designed in the differential circuit set for reducing driving ability of the voltage regulator. Thus, the ground current consumption is reduced and the superposed current can be decreased. Consequently, the metal conducting wire with narrower width can be used. Details of the present invention are illustrated below.

Figure 4:
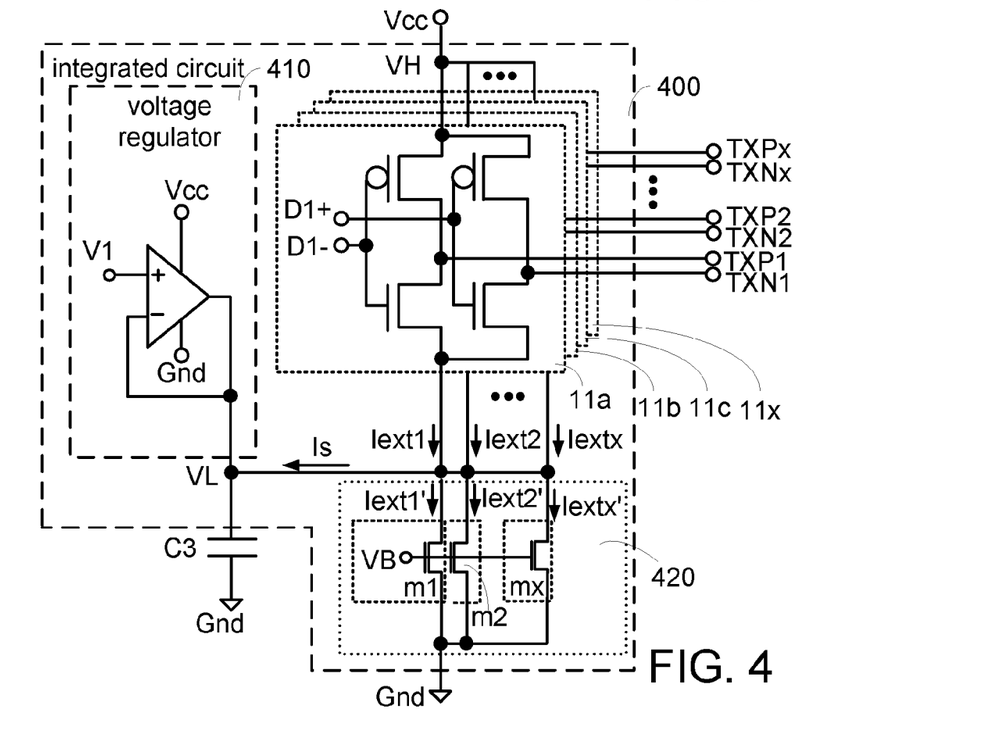
FIG. 4 is a schematic view showing a first embodiment according to the present invention.

FIG. 4 is a schematic view showing a first embodiment according to the present invention. The differential circuit system is inside the integrated circuit 400. The differential circuit system includes a voltage regulator 410, a current drainage circuit set 420 and a differential circuit set. The differential circuit set includes "x" differential circuits. Differential pair (TXP1, TXN1), (TXP2, TXN2), (TXPx, TXNx) of each differential circuit 11a, 11b, 11c, 11x is respectively connected to the external resistor (not shown) of the external circuit. Furthermore, structure of each differential circuit 11a, 11b, 11c, 11x is similar to the ones in FIG. 1, and details of which are not repeatedly illustrated.

Each of the differential circuit 11a, 11b, 11c, 11x in the differential circuit set is connected between the high voltage VH and the low voltage VL in parallel. The integrated circuit 400 is connected to the external voltage Vcc as the high voltage VH. Furthermore, the voltage regulator 310 inside the integrated circuit 400 generates the low voltage VL according to a first voltage V1. Thus, the high voltage is equivalent to the external voltage Vcc and the low voltage VL is equivalent to the first voltage V1. The high voltage VH is greater than the low voltage VL, and the low voltage VL is greater than the ground voltage Gnd.

Moreover, each current drainage circuit in the current drainage circuit set 420 corresponds to a differential circuit. Each current drainage circuit respectively includes a transistor m1 to mx. Gate of the transistors m1, m2, mx receives a bias voltage VB, drain of those is connected to external current output terminal of the differential circuit 11a, 11b, 11c, 11x, and source of those is connected to the ground voltage Gnd. By adjusting the bias voltage VB, the external currents Iext1, Iext2, Iextx outputted by the differential circuit 11a, 11b, 11c, 11x are changed.

According to a first embodiment of the present invention, adjustment of the bias voltage VB allows each current drainage circuit to conduct about 95% of the external current. Therefore, the first drainage current Iext1' is equivalent to 95% of the first external current (Iext1'=0.95Iext1), the second drainage current Iext2' is equivalent to 95% of the second external current (Iext2'=0.95Iext2), and the x-th drainage current Iextx' is equivalent to 95% of the x-th external current (Iextx'=0.95Iextx). The adjustment of the bias voltage VB can be modified according to real application of the differential circuit system.

According to the above illustration, approximately 95% of the external currents Iext1, Iext2, Iextx outputted by the differential circuits 11a, 11b, 11c, 11x are already conducted to the ground voltage Gnd via the current drainage circuit 420. Thus, the superposed current Is received by the voltage regulator 410 is approximate only 5% of summation of the external current, i.e. Is=0.05*(Iext1+Iext2+ . . . +Iextx). Assuming x is 20 and each external current is 3 mA, this implies 57 mA will be conducted by the current drainage circuit set to the ground voltage Gnd and the superposed current outputted to the voltage regulator 410 is only 3 mA.

Since the superposed current Is is only 3 mA, width of the metal conducing wire where the superposed current Is flows can be largely minimized, for instance to 5 μm. Furthermore, driving ability of the voltage regulator 310 may be reduced so that the corresponding ground current consumption is dramatically decreased. A smaller capacitance can thus be used as the external capacitance C3 connected between the output terminal of the voltage regulator 410 and ground voltage Gnd.

Furthermore, NMOS transistors are used for illustration in each current drainage circuit shown in the first embodiment. NPN bipolar transistors can also be used by the person skilled in the art to implement the current drainage circuit. Moreover, number of the current drainage circuits corresponds to number of the differential circuits in the first embodiment, but number of the current drainage circuit is not limited in the present invention. The person skilled in the art can reduce the superposed current by utilizing at least a current drainage circuit and achieve the purpose of the present invention. The transistors in the current drainage circuit set can be connected as current mirror to conduct the external currents Iext1, Iext2, Iextx.

Figure 5:
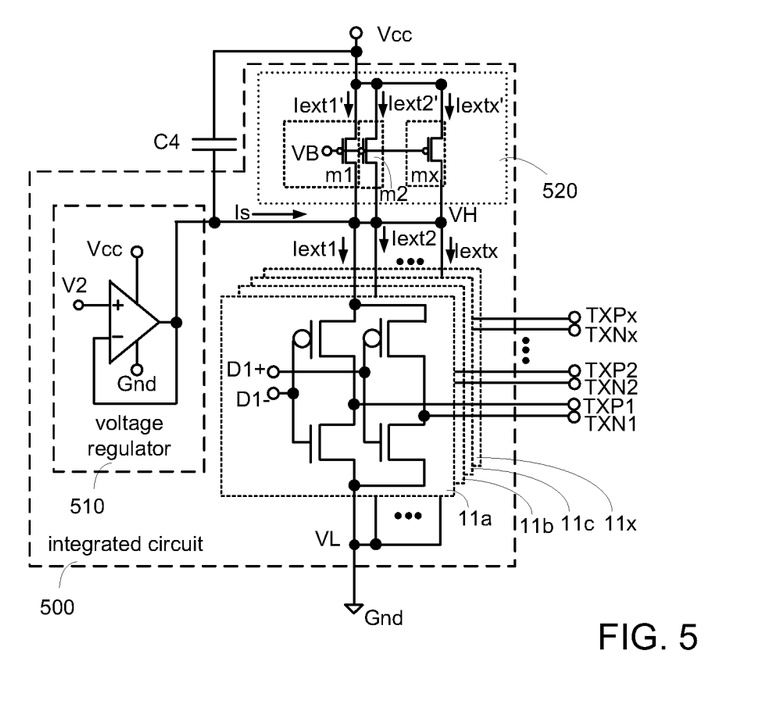
FIG. 5 is a schematic view showing a second embodiment according to the present invention.

FIG. 5 is a schematic view showing a second embodiment according to the present invention. The differential circuit system is inside the integrated circuit 500. The differential circuit system includes a voltage regulator 510, ad current drainage circuit set 520 and a differential circuit set. The differential circuit set includes x differential circuits. Differential pair (TXP1, TXN1), (TXP2, TXN2), (TXPx, TXNx) of each differential circuit 11a, 11b, 11c, 11x is respectively connected to the external resistor (not shown) of the external circuit. Furthermore, structure of each differential circuit 11a, 11b, 11c, 11x is similar to the ones in FIG. 1, and details of which are not repeatedly illustrated.

Each of the differential circuits 11a, 11b, 11c, 11x in the differential circuit set is connected between the high voltage VH and the low voltage VL in parallel. The voltage regulator 510 inside the integrated circuit 500 generates the high voltage VH according to a second voltage V2. Thus, the high voltage is equivalent to the second voltage V2. Furthermore, the ground voltage is used as the low voltage VL. Thus, the external voltage Vcc is greater than the high voltage VH, and the high voltage VH is greater than the low voltage VL.

Moreover, each current drainage circuit in the current drainage circuit set 520 corresponds to a differential circuit. Each current drainage circuit respectively includes a transistor m1 to mx. Gate of transistor m1 to mx receives a bias voltage VB, source of that is connected to external voltage Vcc, and drain of that is connected to the current output terminal of the differential circuit 11a, 11b, 11c, 11x. By adjusting the bias voltage VB, the external current Iext1 to Iextx outputted by the current drainage circuit 11a, 11b, 11c, 11x are changed.

According to the second embodiment of the present invention, adjustment of the bias voltage VB allows each current drainage circuit to conduct about 95% of external current. Therefore, the first drainage current Iext1' is equivalent to 95% of the first external current (Iext1'=0.95Iext1), the second drainage current Iext2' is equivalent to 95% of the second external current (Iext2'=0.95Iext2), and the x-th drainage current Iextx' is equivalent to 95% of the x-th external current (Iextx'=0.95Iextx). The adjustment of the bias voltage VB can be changed according to real application of the differential circuit system.

According to the above illustration, approximately 95% of the external currents Iext1, Iext2, Iextx outputted by the differential circuits 11a, 11b, 11c, 11x are already conducted to the ground voltage Gnd via the current drainage circuit 520. Thus, the superposed current Is is approximately only 5% of summation of the external currents Iext1, Iext2, Iextx, i.e. Is=0.05(Iext1+Iext2+ . . . +Iextx). Assuming x is 20 and each external current is 3 mA, this implies 57 mA will be conducted by the current drainage circuit set to the ground voltage Gnd, and the superposed current outputted to the voltage regulator 510 is only 3 mA.

Since the superposed current Is is only 3 mA, width of the metal conducting wire where the superposed current Is flows can be largely minimized, for instance to 5 μm. Furthermore, driving ability of the voltage regulator 510 may be reduced so that the corresponding ground current consumption is dramatically decreased. A smaller capacitance can thus be used as the external capacitance C4 connected between the output terminal of the voltage regulator 510 and the external voltage Vcc.

Furthermore, PMOS transistors are used for illustration in each current drainage circuit shown in the second embodiment. PNP bipolar transistors can also be used by the person skilled in the art to implement the current drainage circuit. Moreover, number of the current drainage circuit corresponds to number of the differential circuit in the second embodiment, but number of the current drainage circuit is not limited in the present invention. The person skilled in the art can reduce the superposed current by utilizing at least a current drainage circuit and achieve the purpose of the present invention. The transistors in the current drainage circuit set can be connected as current mirror to conduct the external currents Iext1, Iext2, Iextx.

Figure 6:
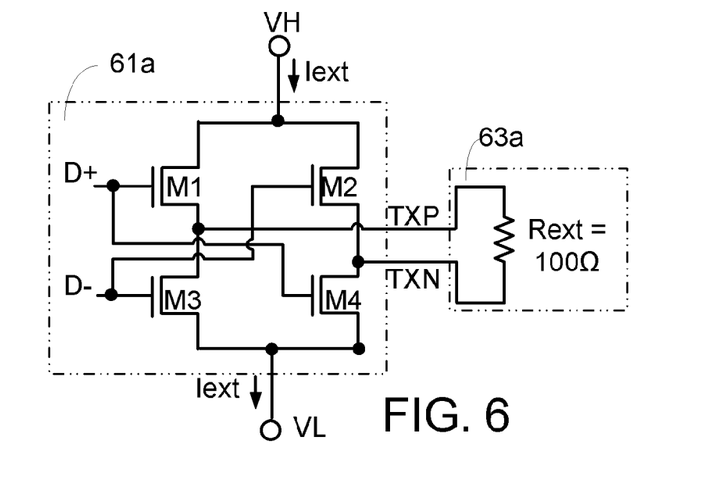
FIG. 6 is a schematic diagram illustrating a differential circuit composed of NMOS transistors.

FIG. 6 is a schematic diagram illustrating a differential circuit composed of NMOS transistors. The differential circuit shown in FIG. 6 is similar to that in FIG. 1 except that all four transistors M1, M2, M3, M4 in FIG. 6 are NMOS transistors.

Source, gate, and drain of the first transistor M1 are respectively electrically connected to a first transmission wire TXP, a positive input signal D+, and a high voltage VH. Source, gate and drain of the third transistor M3 are respectively electrically connected to a low voltage VL, a negative input signal D−, and the first transmission wire TXP.

Source, gate, and drain of the second transistor M2 are respectively electrically connected to a second transmission wire TXN, the negative input signal D−, and the high voltage VH. Source, gate, and drain of the fourth transistor M4 are respectively electrically connected to the low voltage VL, the positive input signal D+, and the second transmission wire TXN. The first transmission wire TXP and the second transmission wire TXN form a differential pair. The first and the second transmission wires TXP, TXN are connected to an external circuit 63a including an external resistor Rext.

Figure 7:
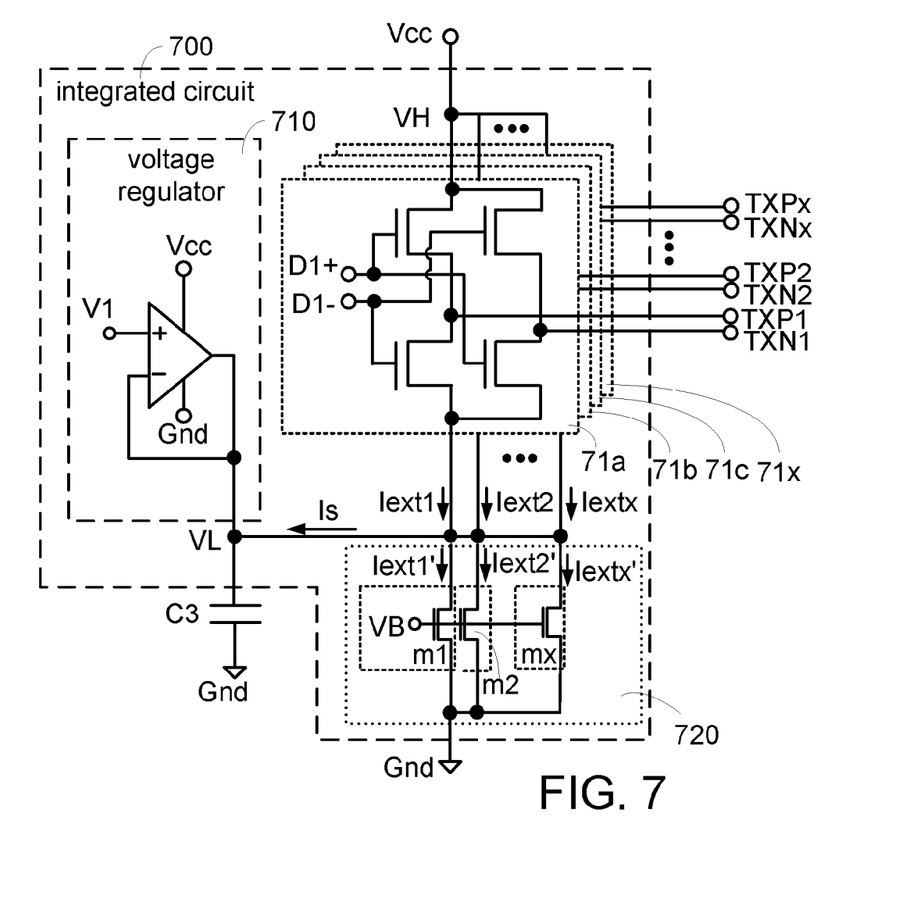
FIG. 7 is a schematic view showing a third embodiment according to the present invention.

FIG. 7 is a schematic view showing a third embodiment according to the present invention. The differential circuit system is inside the integrated circuit 700. The differential circuit system includes a voltage regulator 710, a current drainage circuit set 720 and a differential circuit set. The differential circuit set includes "x" differential circuits 71a, 71b, 71c, 71x. Detail operations of the integrated circuit 700 are similar to the ones in FIG. 4 thus are not further illustrated.

The current drainage circuit set 720 includes plural current drainage circuits and each current drainage circuit corresponds to a differential circuit. Each current drainage circuit respectively includes a transistor m1 to mx. Gate of the transistors m1, m2, mx receives a bias voltage VB, drain of those is connected to external current output terminal of the differential circuits 71a, 71b, 71c, 71x, and source of those is connected to the ground voltage Gnd. By adjusting the bias voltage VB, the external currents Iext1, Iext2, Iextx outputted by the differential circuits 71a, 71b, 71c, 71x are changed.

Figure 8:
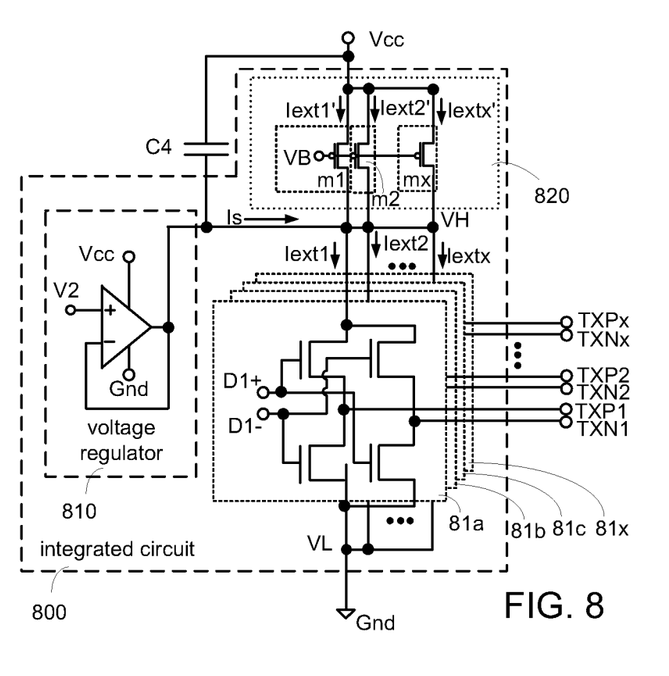
FIG. 8 is a schematic view showing a fourth embodiment according to the present invention.

FIG. 8 is a schematic view showing a fourth embodiment according to the present invention. The differential circuit system is inside the integrated circuit 800. The differential circuit system includes a voltage regulator 810, a current drainage circuit set 820 and a differential circuit set. The differential circuit set includes "x" differential circuits 81a, 81b, 81c, 81x. Detail operations of the integrated circuit 800 are similar to the ones in FIG. 5 thus are not further illustrated.

The current drainage circuit set 820 includes plural current drainage circuits and each current drainage circuit corresponds to a differential circuit. Each current drainage circuit respectively includes a transistor m1 to mx. Gate of the transistors m1, m2, mx receives a bias voltage VB, drain of those is connected to external current output terminal of the differential circuits 81a, 81b, 81c, 81x, and source of those is connected to the ground voltage Gnd. By adjusting the bias voltage VB, the external currents Iext1, Iext2, Iextx outputted by the differential circuits 81a, 81b, 81c, 81x are changed.

According to the above illustrations, a current drainage circuit set is used in different types of the differential circuit systems. The current drain circuit set conducts the output voltage generated by the current drainage differential circuit set in the present invention. Thus, the loading of the voltage regulator is reduced and the consumption of the ground current is decreased. In addition, with the current drainage circuit set, width of the metal conducting wire which the superposed current flows can be reduced so that layout area of the integrated circuit can be minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A differential circuit system in an integrated circuit, connected to an external power source for receiving an external voltage and a ground voltage, the differential circuit system comprising:
    a differential circuit set, comprising a plurality of differential circuits connected between a first node and a second node, wherein each of the plurality of the differential circuits generates a current flowing from the first node to the second node, wherein the first node supplies a high voltage and the second node supplies a low voltage and the first node receives the external voltage;
    a voltage regulator, for generating the low voltage according to a first voltage and supplying the low voltage to the second node; and
    a current drainage circuit set, connected between the second node and the ground voltage, for generating a drainage current, wherein a superposed current flowing to the voltage regulator is equivalent to summation of a plurality currents outputted by the plurality of differential circuits minuses the drainage current.

2. The differential circuit system as claimed in claim 1, wherein a first differential circuit among the differential circuit set comprises:
    a first transistor, with a source connected to the first node, a gate receiving a negative input signal, and a drain connected to a first transmission wire;
    a second transistor, with a source connected to the first node, a gate receiving a positive input signal and a drain connected to a second transmission wire;

a third transistor, with a source connected to the second node, a gate receiving the negative input signal, and a drain connected to the first transmission wire; and a fourth transistor, with a source connected to the second node, a gate receiving the positive input signal, and a drain connected to the second transmission wire, wherein a first differential pair of the first differential circuit, formed by the first and the second transmission wires, is connected to two terminals of an external resistor outside the integrated circuit.

3. The differential circuit system as claimed in claim 1, wherein a first differential circuit among the differential circuit set comprises:

a first transistor, with a drain connected to the first node, a gate receiving a positive input signal, and a source connected to a first transmission wire;

a second transistor, with a drain connected to the first node, a gate receiving a negative input signal and a source connected to a second transmission wire;

a third transistor, with a source connected to the second node, a gate receiving the negative input signal, and a drain connected to the first transmission wire; and a fourth transistor, with a source connected to the second node, a gate receiving the positive input signal, and a drain connected to the second transmission wire, wherein a first differential pair of the first differential circuit, formed by the first and the second transmission wires, is connected to two terminals of an external resistor outside the integrated circuit.

4. The differential circuit system as claimed in claim 1, wherein the current drainage circuit set includes at least one current drainage circuit, and the drainage current is summation of current generated by the at least one current drainage circuit.

5. The differential circuit system as claimed in claim 4, wherein a first current drainage circuit of the current drainage circuit set includes a transistor, wherein control terminal of the transistor receives a bias voltage and two other terminals are connected between the second node and the ground voltage.

6. The differential circuit system as claimed in claim 5, wherein the transistor is an NMOS transistor, with a gate receiving the bias voltage, a drain connected to the second node, and a drain receiving the ground voltage.

7. The differential circuit system as claimed in claim 5, wherein the transistor is an NPN bipolar transistor.

8. The differential circuit system as claimed in claim 1, wherein an external capacitance, connected in between the second node and the ground voltage, is outside the integrated circuit.

9. A differential circuit system in an integrated circuit, connected to an external power source for receiving an external voltage and a ground voltage, the differential circuit system comprising:

a differential circuit set, comprising a plurality of differential circuits connected between a first node and a second node, wherein each of the plurality of the differential circuits generates a current flowing from the first node to the second node, wherein the first node supplies a high voltage and the second node supplies a low voltage and the second node receives the ground voltage;

a voltage regulator, for generating the high voltage according to a second voltage and supplying the high voltage to the first node; and a current drainage circuit set, connected between the first node and the external voltage, for generating a drainage current, wherein a superposed current supplied by the voltage regulator is equivalent to summation of a plurality currents outputted by the plurality of differential circuits minuses the drainage current.

10. The differential circuit system as claimed in claim 9, wherein a first differential circuit among the differential circuit set comprises:

a first transistor, with a source connected to the first node, a gate receiving a negative input signal, and a drain connected to a first transmission wire;

a second transistor, with a source connected to the first node, a gate receiving a positive input signal and a drain connected to a second transmission wire;

a third transistor, with a source connected to the second node, a gate receiving the negative input signal, and a drain connected to the first transmission wire; and a fourth transistor, with a source connected to the second node, a gate receiving the positive input signal, and a drain connected to the second transmission wire, wherein a first differential pair of the first differential circuit, formed by the first and the second transmission wires, is connected to two terminals of an external resistor outside the integrated circuit.

11. The differential circuit system as claimed in claim 9, wherein a first differential circuit among the differential circuit set comprises:

a first transistor, with a drain connected to the first node, a gate receiving a positive input signal, and a source connected to a first transmission wire;

a second transistor, with a drain connected to the first node, a gate receiving a negative input signal and a source connected to a second transmission wire;

a third transistor, with a source connected to the second node, a gate receiving the negative input signal, and a drain connected to the first transmission wire; and a fourth transistor, with a source connected to the second node, a gate receiving the positive input signal, and a drain connected to the second transmission wire, wherein a first differential pair of the first differential circuit, formed by the first and the second transmission wires, is connected to two terminals of an external resistor outside the integrated circuit.

12. The differential circuit system as claimed in claim 9, wherein the current drainage circuit set includes at least one current drainage circuit, and the drainage current is summation of current generated by the at least one current drainage circuit.

13. The differential circuit system as claimed in claim 12, wherein a first current drainage circuit of the current drainage circuit set includes a transistor, wherein control terminal of the transistor receives a bias voltage and two other terminals are connected between the first node and the external voltage.

14. The differential circuit system as claimed in claim 13, wherein the transistor is a PMOS transistor, with a gate receiving the bias voltage, a drain connected to the first node, and a drain receiving the external voltage.

15. The differential circuit system as claimed in claim 13, wherein the transistor is a PNP bipolar transistor.

16. The differential circuit system as claimed in claim 9, wherein an external capacitance, connected in between the first node and the external voltage, is outside the integrated circuit.

* * * * *